United States Patent [19]
Laznicka, Jr.

[11] Patent Number: 5,686,990
[45] Date of Patent: Nov. 11, 1997

[54] OPTICAL SOURCE ISOLATOR WITH POLARIZATION MAINTAINING OPTICAL FIBER AND ASPHERIC COLLIMATING AND FOCUSING LENS

[75] Inventor: Oldrich M. Laznicka, Jr., Wellesley, Mass.

[73] Assignee: The Charles Stark Draper Laboratory, Inc., Cambridge, Mass.

[21] Appl. No.: 416,496

[22] Filed: Apr. 4, 1995

Related U.S. Application Data

[63] Continuation of Ser. No. 986,799, Dec. 8, 1992, abandoned.

[51] Int. Cl.$^6$ ................................................ G01B 9/02
[52] U.S. Cl. ........................................................ 356/350
[58] Field of Search ................................. 356/350, 345; 250/227.19, 227.27

[56] References Cited

U.S. PATENT DOCUMENTS

| | | | |
|---|---|---|---|
| 4,299,490 | 11/1981 | Cahill et al. | 356/350 |
| 4,588,296 | 5/1986 | Cahill et al. | 356/350 |
| 4,671,658 | 6/1987 | Shaw et al. | 356/350 |
| 4,915,503 | 4/1990 | Pavlath | 356/350 |
| 4,923,299 | 5/1990 | Anderson et al. | 356/350 |
| 4,997,282 | 3/1991 | Pavlath | 356/350 |
| 5,177,356 | 1/1993 | Matsui et al. | 356/377 |

OTHER PUBLICATIONS

Bergh et al., "An Overview of Fiber–Optic Gyroscopes," Journal of Lightwave Technology, vol. LT–2, No. 2, pp. 91–95, Apr. 1984.

*Primary Examiner*—Samuel A. Turner
*Attorney, Agent, or Firm*—Lappin & Kusmer LLP

[57] ABSTRACT

An optical component for use in optical devices, such as an interferometer fiber optic gyroscope including a polarizing beamsplitter and a non-reciprocal optical device mounted on a common substrate; and an optical transceiver. The optical component may be used in a low loss configuration with an optical source and a photodetector and associated focusing lenses and a fiber optic ring or coil sensor for a gyroscope. The non-reciprocal device rotates the polarization plane of light. transmitted from the source through the beamsplitter to the sensor, and light returned from the sensor toward the beamsplitter, by 45 degrees in the same direction so that substantially all return light incident on the beamsplitter is reflected toward the photodetector.

17 Claims, 6 Drawing Sheets

OPTICAL SOURCE ISOLATOR WITH POLARIZATION MAINTAINING OPTICAL FIBER AND ASPHERIC COLLIMATING AND FOCUSING LENS

This application is a continuation of application Ser. No. 07/986,799, filed Dec. 8, 1992, now abandoned.

BACKGROUND OF THE INVENTION

This invention relates in general to fiber optic devices and more particularly to a hybrid component for such devices which combines the optical sub-components into a single unit.

Such devices are useful in areas, particularly in communications systems and in gyroscopes, such as interferometric fiber optic gyros (IFOG's).

In the prior art, IFOG's are generally constructed with discrete components including an optical source, an optical fiber sensing coil (or ring), photodetectors, and coupling devices to transmit light from the optical source to the optical fiber sensing coil and from the optical fiber sensing coil to a photodetector. Coupling elements are normally optical fiber couplers in an all optical fiber IFOG.

Figure 1A:
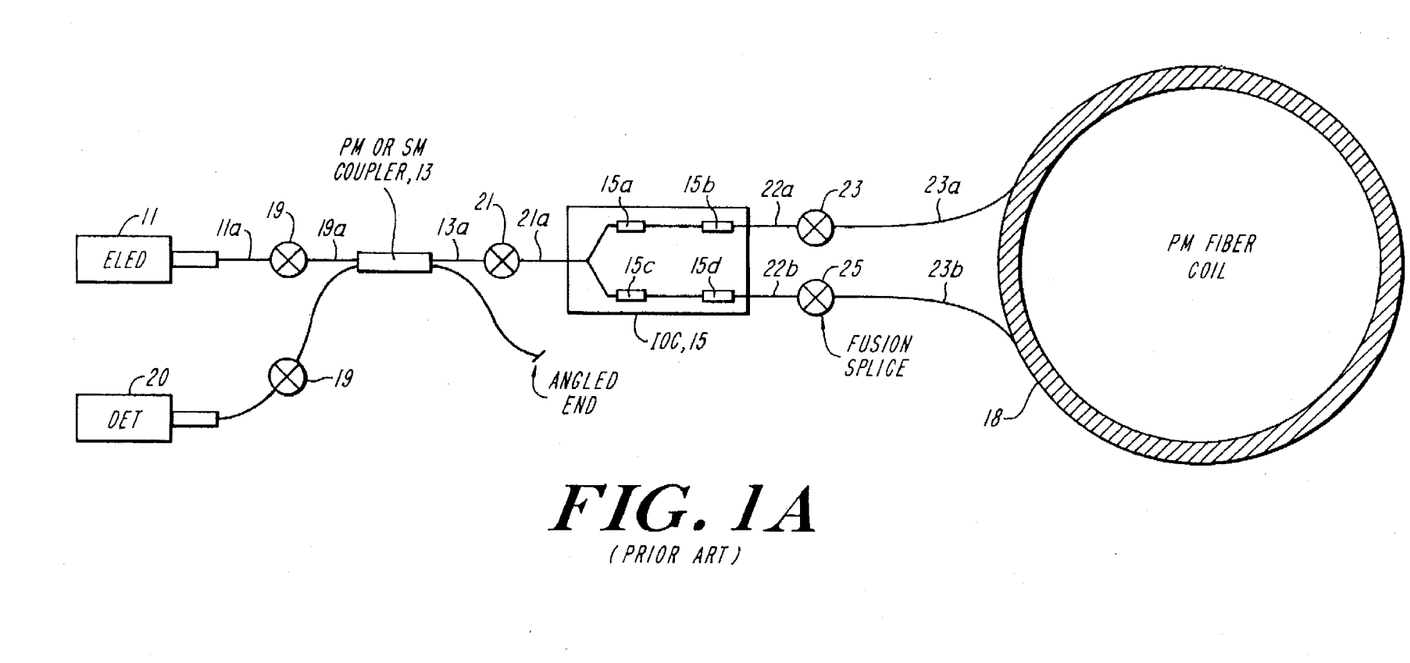
FIG. 1A is an illustration in schematic form of a prior art gyroscope device.

FIG. 1A illustrates an IFOG as known in the prior art. Light from a generally monochromatic source 11 is launched into an optical fiber 11a and is coupled via splice 19 and fiber 19a through a polarization-maintaining (PM) or single mode (SM) beamsplitter/coupler 13. The light exiting from beamsplitter/coupler 13 is coupled via fiber 13a, splice 21 and fiber 21a to an integrated optical circuit (IOC) 15, where the light is split into two parallel channels, permitting different phase modulation on each channel. The modulation, as desired, is established by modulators 15a, 15b, 15c and 15d. Light from one channel is provided via fiber 22a, splice 23 and fiber 23a to a fiber optical coil 18 to propagate in a clockwise direction through the coil 18, while light from the second channel is provided via fiber 22b, splice 25, and fiber 23b to the fiber optic coil 18 to propagate in a counterclockwise direction. Rotation of the plane of the fiber optic coil 18 results in a Sagnac shift whereby the effective optical path length for light traveling in one direction differs from the effective optical path length for light traveling in the opposite direction. The counterpropagating light is extracted from the coil and passed back through above noted fibers, end splices, the IOC 15 and the splitter/coupler 13 to a photodetector 20, where the light from the two channels is combined to set up an interference pattern at detector 20, which provide a measure of the rotational motion at coil 18 about an axis perpendicular to the principal plane of that coil.

In this type of architecture, light is transmitted through the beamsplitter/coupler 13, and various fibers and splices, resulting in a 50% reduction of optical power passed to the fiber optic coil 18. Thus, only 50% of the light from the source 11 is coupled to the fiber optic coil 18. The combined light output from the fiber optic coil 18 is returned again through the beamsplitter/coupler 13 and various fibers and splices, resulting in a further 50% reduction of power. That low level light is then supplied to the photodetector 20, where the optical signal is demodulated to detect the rotation rate. However, there is in excess of 6 dB input/return loss of power due to the beamsplitter/coupler and various fibers and splices.

The second problem in such an arrangement is that the 50% of the return light which is not coupled to the photodetector 20 by beamsplitter/coupler 15 is coupled back to the light source 11, where it may have an adverse effect on the spectral quality and output power of that source. A convention remediation for this problem is to include an optical isolator between the coupler 13 and the light source 11 to prevent this return light from being incident on the light source 11.

Still another disadvantage in this prior art design is that there is no proven long term (e.g. 20 years) polarization maintaining or single mode fiber optic coupler for use in such an assembly.

In optical communications applications, it is desirable to have an optical transceiver which both launches a modulated optical signal onto a fiber optic signal path and receives a modulated optical signal from that same path, whereupon the latter signal is demodulated to extract information therefrom. Prior art optical transceivers for accomplishing these functions, are generally similar to the IFOG configuration described above (except that the IOC and ring are replaced by single channel polarizing optical modulation circuit and an elongated fiber optic signal path extending to a next adjacent transceiver on the network such that all fiber transceivers suffer from the same (primarily loss) disadvantages as do the prior art all-fiber gyros.

Figure 1B:
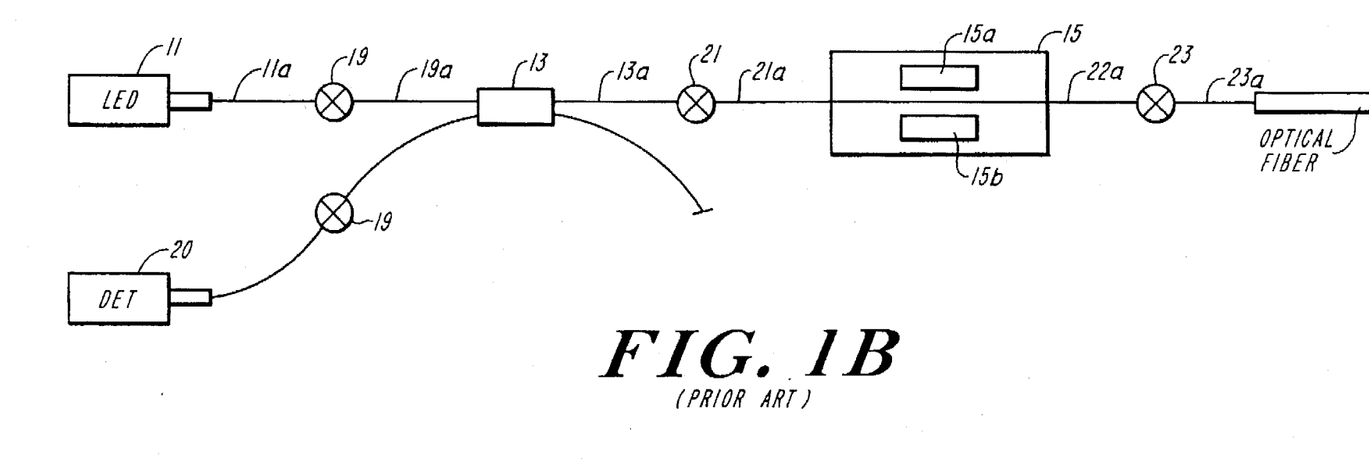
FIG. 1B is an illustration in schematic form of a prior art optical transceiver.

FIG. 1B shows a schematic representation of a prior art transceiver in which elements that correspond to elements in FIG. 1A are identified with the ame reference designations.

It is therefore an object of the present invention to provide improved fiber optic devices.

Another object is to provide a low loss optical coupling system for use in an IFOG. Still another object is to provide a low loss and optical subsystem in which the various discrete components are combined on a single substrate, providing low loss coupling and stable polarization.

Yet another object is to provide a low loss optical transceiver.

Still another object is to provide an unproved optical transceiver in which various discrete components are combined on a single substrate providing low loss coupling and stable polarization.

SUMMARY OF THE INVENTION

Broadly speaking, in the present invention, a generally monochromatic light source, such as a light emitting diode (LED), is mounted on a substrate together with a photodetector, a polarizing beamsplitter and a nonreciprocal isolating optical device, e.g. Faraday Rotator, together with a focusing lens and collimating lens for focusing the light passing from the light source through the polarizing beamsplitter, and from the Faraday Rotator into a polarization maintaining optical fiber pigtail. In variants, only the polarizing beamsplitter and nonreciprocal isolating optical device need be directly affixed to the substrate. In some forms, it is preferred that the substrate have its temperature controlled (for example with a thermo-electric cooler) to provide stability, permitting better control of the optical phase of the propagating modes.

This arrangement provides, as a first advantage over this prior art, a single unified package, which typically might be in the form of a conventional fourteen pin DIP or "butterfly" package. As noted above, the Faraday Rotator and beamsplitter alone may be in a single package, or substrate, for use with discrete focusing lenses, optical source and photodetector control mounted otherwise. As a further advantage, this improved single substrate configuration provides a substantially improved control of polarization.

Moreover, there is a substantial improvement in power loss factor, because of the efficiency of the light coupling, in that the power loss from the light source to the ring and returning from the ring to the photodetector is approximately 2.5 dB, thereby producing an excellent signal to noise ratio.

BRIEF DESCRIPTION OF THE DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENT

Figure 2:
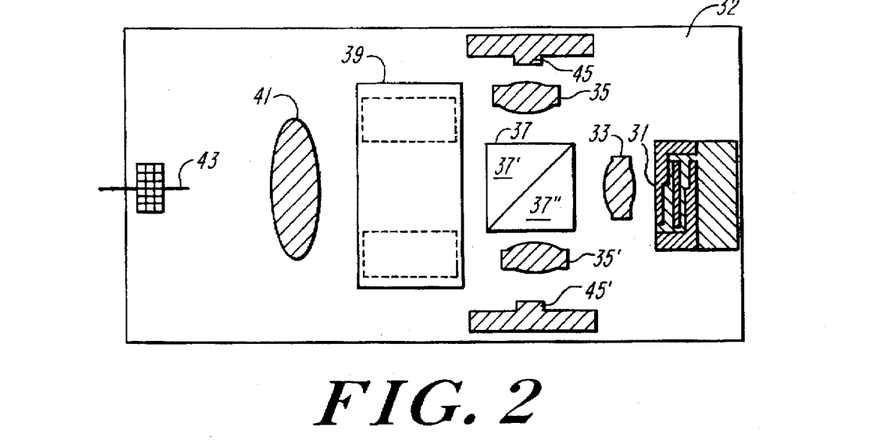
FIG. 2A is a generally top or plan view of one embodiment of the optical system of this invention.
FIG. 2B shows a sectional view along lines 2B-2B of the embodiment of FIG. 2A.
Figure 2A:
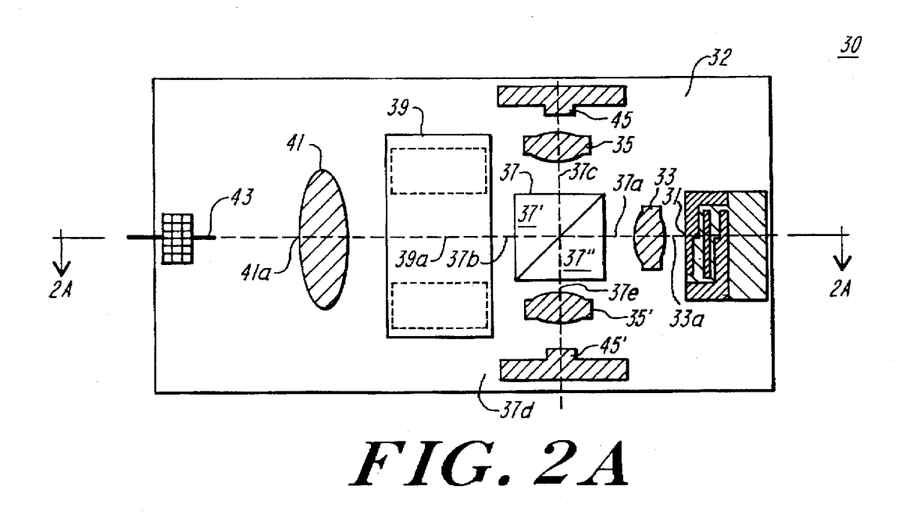
Figure 2B:
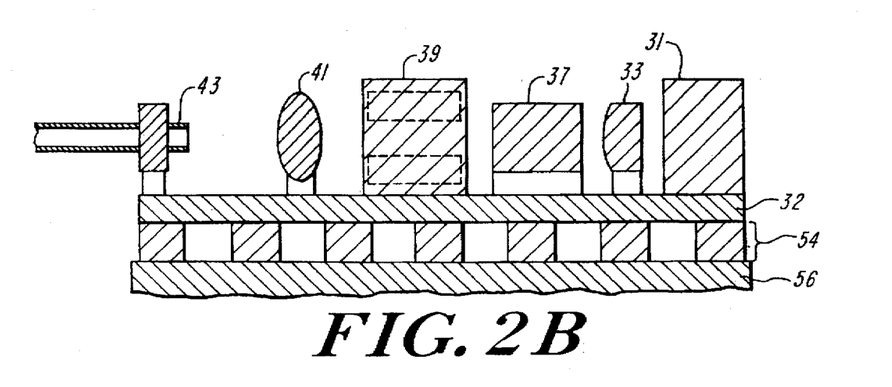

In the embodiment illustrated in FIGS. 2A and 2B, a hybrid optical system 30 is illustrated partially in section. The system 30 provides a component for an IFOG, or a transceiver, in which most of the optical elements are mounted on a single substrate 32 to form a single package which can be hermetically sealed. The function of this package is to provide substantially monochromatic light from a light source. For IFOG's, LED's are preferred sources. For transceivers, LED's may be used, or distributed feedback lasers (DFB's), or crystal lasers or fiber source may be used. In the illustrated embodiment, light emitting diode (LED) 31 provides light through a collimating lens 33 to a polarizing beamsplitter 37 and a nonreciprocal isolating optical device 39, e.g. a Faraday Rotator, through a focusing lens 41 into a fiber pigtail connector 43 to the fiber optic ring or coil (not shown) of the IFOG. The return light from this ring is coupled back through the pigtail connector 43, the lens 41, and the Faraday Rotator 39 to the polarizing beamsplitter 37, but, as a result of rotation of the polarizing plane by the Faraday Rotator 39, the returning light is reflected away from the light source 31 through a focusing lens 35 and focused onto a photodetector 45.

FIG. 2B shows a sectional view of the system 30, showing thermoelectric cooler elements 54 which support (and control the temperature of) substrate 32. The elements 54 are mounted on a rigid base 56. FIG. 2A shows a schematic representation of the optical train, including lens 33, beamsplitter 37, non-reciprocal device 39 and lens 41. The optical axis 33a of lens 33 is coaxial with a first input axis 37a of beamsplitter 37. Light passing toward beamsplitter 37 along axis 37a is partly passed through beamsplitter 37 whereupon it exits along a first output axis 37b and partly reflected along a second output axis 37c. The first output axis is coaxial with the principal axis 39a (NR axis) of non-reciprocal device 39, so that light from beamsplitter 37 passes through device 39 along the NR axis and the principal axis 41a of lens 41 toward the optical fiber of pigtail coupler 43. Light returning from the optical coil 18 through the fiber of coupler 43 passes along axis 41a, axis 39a and is incident on beamsplitter 37 along a second input axis 37d which is coincident with axis 37b. That light is reflected from the front surface of beamsplitter 37 along a third output axis 37e.

In the embodiment shown in FIG. 2A and 2B, the light emitting diode 31 is a standard communication grade ridge waveguide LED manufactured by Lasertron, Inc., Burlington, Mass. It is especially screened for smooth spectral characteristics with a full-width-half-max (FWHM) of approximately 35 nm. The LED 31 emits a semicircularly polarized symmetric Gaussian beam with a FWHM of 50 degrees. The LED 31 is mounted at the edge of the substrate 32. In alternative embodiments, a laser diode may be used in place of the LED. However, with the low loss associated with the present invention, LED's may readily be used.

In the illustrated embodiment, light from the LED 31 is passed through a collimating lens 33 which, most advantageously, is an aspheric lens, where this light is collimated to a beam diameter of 1.6 mm and focused into a polarizing beamsplitter 37. The aspheric lens is a model 31050 lens manufactured by Corning, Inc., Corning, N.Y. It is AR coated to reduce back reflection to less than 1%. The advantage of using aspheric lenses is that it is able to bend light at larger angle without distortion and also reduces the cost of each lens due to the low cost molded glass manufacturing technique used.

The polarizing beamsplitter 37 is a cube beamsplitter having a first prism element 37' separated from a second prism element 37" by a multilayer film. The prism elements are made of glass, and the film layers are silicon oxide and titanium oxide layers conventionally configured to establish a PM beamsplitter with a 2 mm clear aperture. The input and output faces of the beamsplitter 37 have antireflection coatings. The unpolarized light from the lens 33 enters the beamsplitter 37, where it is split into two orthogonally linearly polarized beams, an s-polarized beam and a p-polarized beam. The s-polarized beam is reflected along axis 37c out of the optical train, while the p-polarized beam is transmitted through the beamsplitter 37 and along axis 37b to the nonreciprocal device 39. While the illustrated beamsplitter is a cube beamsplitter, other beamsplitter configurations may be used. Moreover, in the preferred embodiment, an optical dump is used opposite the beamsplitter 37 to absorb light reflected along axis 37c from the beamsplitter 37. In the illustrated embodiment, the optical dump is a "dummy" photodetector 45' and associated lens 35' which is designed to efficiently convert light incident thereon to electrons. Other forms of optical dumps may be used.

The Faraday Rotator, model 7548 manufactured by Optics for Research, Inc., Coldwell, N.J. is a Yttrium-Iron-Garnet (YIG) crystal with an associated permanent magnet for effecting a bias magnetic field. The YIG crystal is a cylindrical shell with outer diameter 4.54 mm, inner aperture 1.7 mm diameter and length 3.5 mm. Alternatively, other non-reciprocal devices, such as a Bismuth-Iron-Garnet (BIG) can be used. The purpose of this device 39 is to rotate the plane of polarization of the light entering it by substantially 45 degrees for each pass through device 39. Thus, the polarization vector of the polarized light from the beamsplitter 37 (i.e. light passing from left to right, as shown in FIG. 2A) is rotated by 45 degrees in a clockwise direction as viewed along the propagation axis as it traverses through the device 39 to the focusing lens 41. As described more fully below, the polarization vector of light passing from the lens 41 (i.e. light passing from right to left, as shown in FIG. 2A) is also rotated by 45 degrees in a clockwise direction as it traverses through the device 39.

In the illustrated embodiment, the focusing lens 41 is a laser focusing and receiver singlet lens, model LFS035 manufactured by Melles Griot, Irvine, Calif. The focusing lens 41 focuses the light into a PM optical fiber of pigtail connector 43.

The fiber used is the PM fiber 43. That fiber has an acceptance angle of 10.9 degrees and, accordingly, the focusing lens is underfilled since the collimated light passing through it is emitted at an angle of 9.2 degrees to the fiber. The coupling loss for this arrangement is approximately 2.5 dB. The light from the fiber of pigtail coupler 43 passes into the IFOG fiber optic ring (not shown) and propagates through the ring and back to the pigtail coupler 43. Since the fiber 43 is a polarization maintaining fiber, the light returning to coupler 43, the "return light", has substantially the same polarization as the input light coupled to that fiber through the pigtail coupler 43. The return light returning from the ring exits the fiber of coupler 43 and is collimated by the focusing lens 41 with an insertion loss of approximately 1.5 dB, and is directed along axis 39a through the YIG device 39. As this return light passes through the YIG device 39, its plane of polarization is rotated 45 degrees in a clockwise direction as viewed along the propagation axis. As a result, the plane of polarization of the return light exiting from device 39 is offset by 90 degrees from the plane of polarization of the light initially transmitted through the polarizing beamsplitter 37 from the LED 31. Thus, the p-polarization beam, as it originally emerges from the polarizing beamsplitter 37 along axis 37b, is returned along axis 37d (which is coaxial with axis 37b) in the s-polarization state, but oppositely directed. Accordingly, this return beam is reflected by the polarizing beamsplitter 37 along axis 37e toward the detector 45, rather than being transmitted to the light source 31. Since there is no p-polarization component, 99% of the return optical power from the ring is directed to the photodetector 45. A second aspheric lens 35 (model 31050, manufactured by Corning Glass, Corning, N.Y.) focuses the light reflected from the polarizing beamsplitter onto the surface of photodetector 45. In order to reduce back reflections off of the fiber at the pigtail, the PM fiber 43 is angle polished by 10 degrees and then tilted by approximately 5%. This angular orientation may be accomplished by positioning the pigtail fiber with respect to the stationary optical train. With this design, back reflections off of the fiber are directed away from the source. In addition, other methods to reduce back reflections and improve fiber coupling are to polish a cone on the fiber end to etch a coupling lens on the fiber tip. Without the angle polishing, or such other methods, the normal fiber end would reflect a significant amount of light back to the source 31. Since typical fibers have an index of refraction of 1.45, almost 4% of the incident light would be back reflected, resulting in Fabray-Perot resonating modes, and increasing the spectral ripple on the optical source profile.

The photodetectors 45 and 45' are standard communication grade 60 μm diameter in GaAs detectors. Such a detector is preferred because of its small dark current, capacitance and because its small area limits the amount of stray light than can reach the detector. In the preferred embodiment, the photodetector is a model QDFT pin FET chip manufactured by Lasertron, Inc., Burlington, Mass. The focusing lens 35, which focuses light reflected from the beam splitting polarizer 37 onto to the photodetector 45, is identical to the aspheric lens 33 used to collimate the light from the LED 31 into the polarizing beamsplitter 37.

In the illustrated embodiment, all of the optical surfaces have a conventional antireflective coating optimized for the 1300 nm light from. LED 31 so that there is less than 1% reflection at each surface.

Figure 3A:
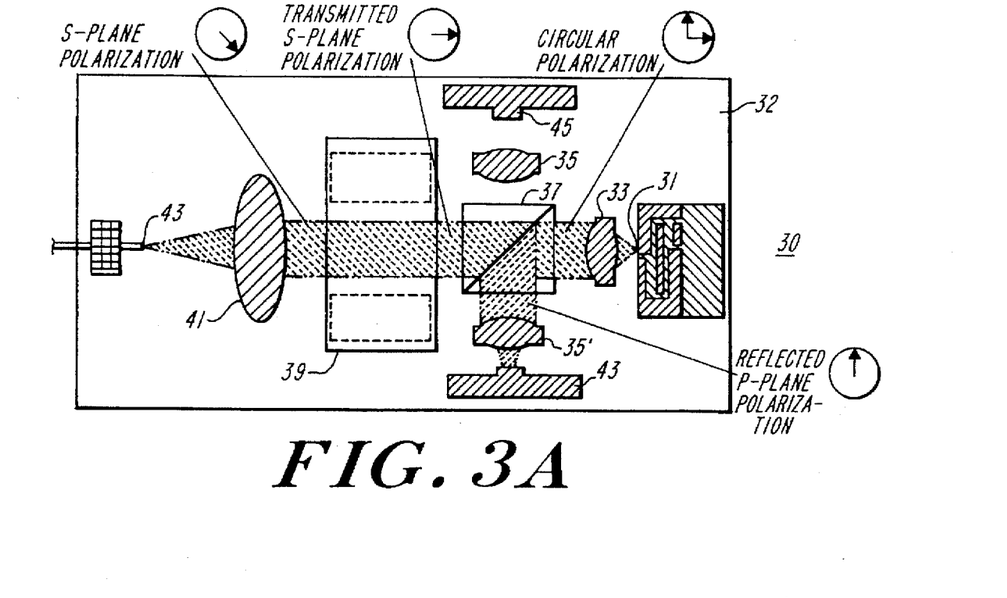
FIGS. 3A and 3B illustrate the polarization of light passing through the optical system of FIG. 2 in the forward and return directions, respectively.
Figure 3B:
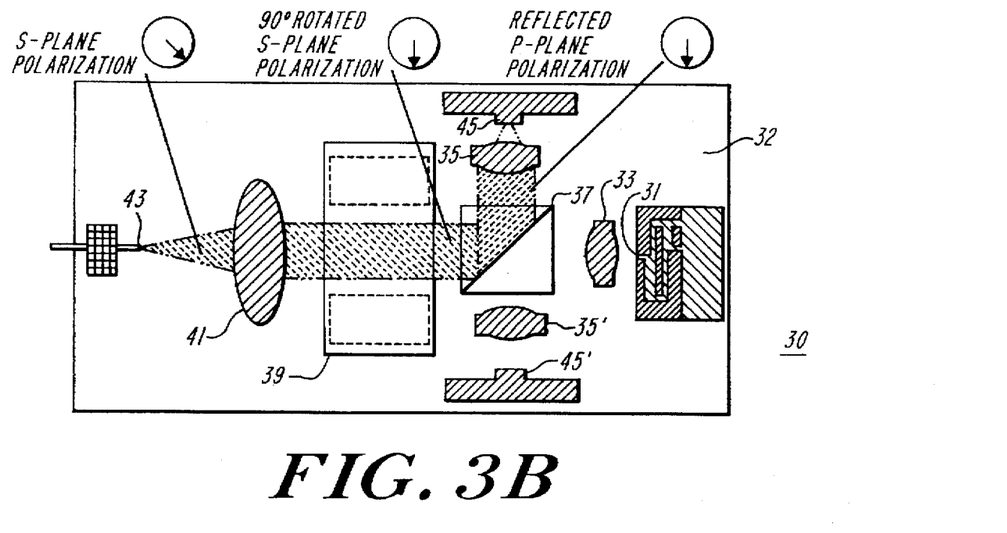

FIGS. 3A and 3B illustrate the polarization of light passing through the system 10 in the forward direction (i.e. from source 31) and in the return direction (i.e. from the fiber optic coil of the gyro), respectively. Elements 35' and 45' are not shown in FIGS. 3A and 3B.

As shown in FIG. 3A, source 31 generates circularly polarized light which is focused by lens 33 onto the beamsplitter 37. The P-plane polarized component of that incident light is reflected toward detector 46. The S-plane polarized component is passed through to the NR axis of the non-reciprocal device 39. The polarization plane of that light is rotated 45 degrees as it passes through device 39. The light exiting from device 39 is then focused by lens 41 and directed to the optical fiber of pigtail coupler 43 which is coupled to the optical coil of the gyro.

As shown in FIG. 3B, light returned from the optical coil of the gyro through the optical fiber of pigtail coupler 43 is directed by lens 41 to be incident on non-reciprocal device 39 along the NR axis 39a. The polarization plane of that light is rotated by 45 degrees so that it is polarized substantially in the S-plane (i.e. 90 degrees offset with respect to the light passed from beamsplitter 37 which is incident on device 39). The resultant P-plane polarized light passed from device 39 is incident on beamsplitter 39, whereupon that light is reflected via lens 35 to the photodetector 45.

The arrangement shown and described with respect to FIGS. 2A and 2B and 3A and 3B have several advantages over the conventional component arrangement for performing this function. The package is compact and therefore achieves a reduction in size of the area needed in the IFOG to perform this function. A single 14 pin butterfly package is sufficient. As described previously in a conventional prior art IFOG, there is a 6 dB loss because of the losses in a 50/50 optical coupler as well as loss that occurs in coupling the light to the optical fiber.

Figure 4:
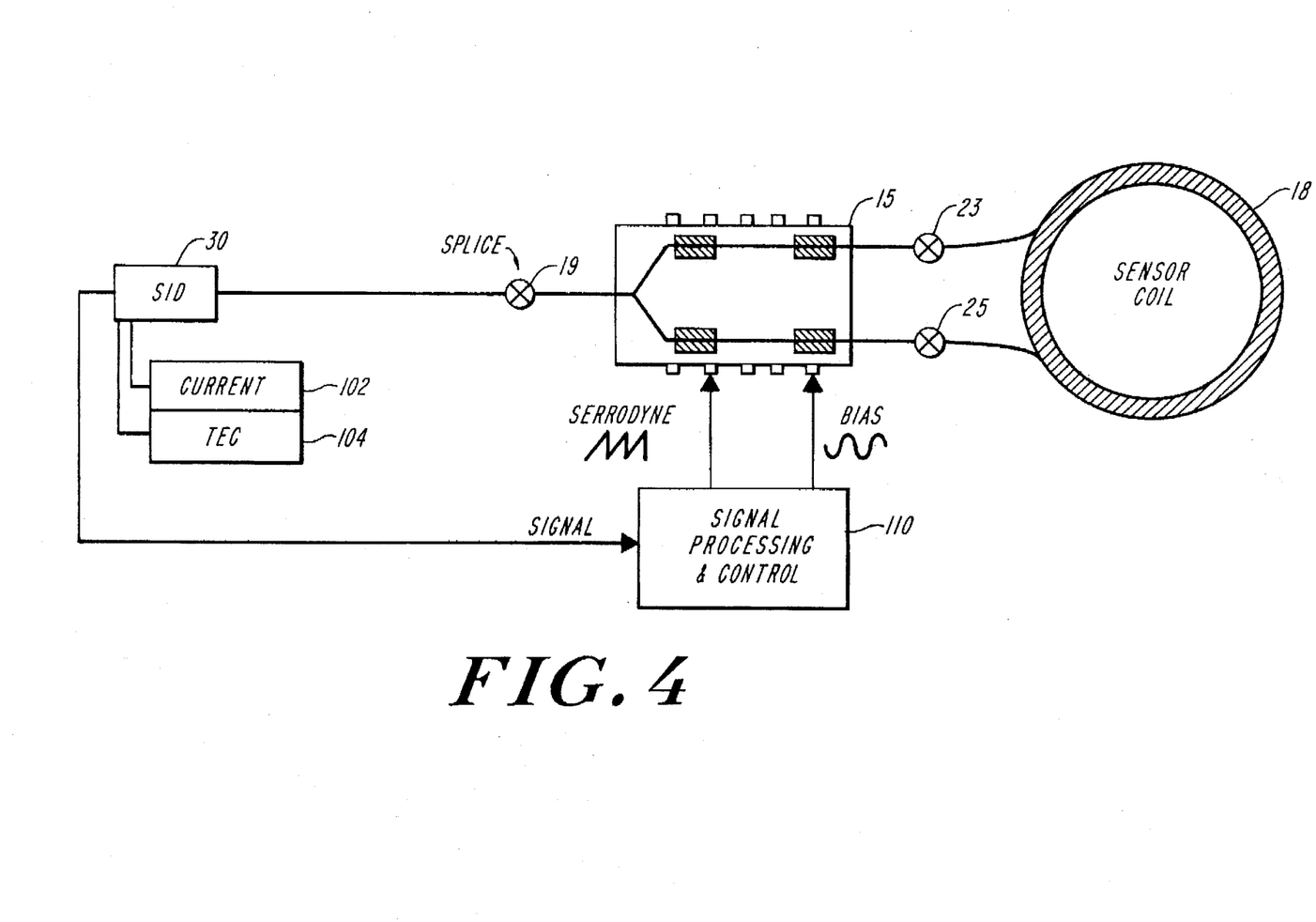
FIG. 4 shows, in schematic form, an interferometric fiber optic gyro which includes the optical system of the present invention.

An exemplary IFOG 100 using the present invention is shown in FIG. 4. IFOG 100 includes the optical system 30 with associated current driver 102, a thermo electric cooler 104, and a signal processing and control network 110. Other components corresponding to those in the configuration illustrated in FIG. 1 are identified with the same reference designations. Since the 6 dB coupling loss is eliminated in the arrangement of this invention there is an improved signal to noise ratio associated with it, and the use of the focusing lenses reduces any coupling loss to the single mode optical fiber of pigtail coupler 43. Because of the rotation of the polarizing plane by the nonreciprocal device in both the original pass and the return pass, no light is passed back to the light source, and hence an isolator is not needed between the polarizing beamsplitter and the light source to prevent return light from reaching the source, since the optical system acts as an isolator. Again, because of the efficient transmission of polarizing light through the optical beamsplitter, there is minimum noise pickup due to cross coupling of the polarization in the beamsplitter.

While the optical systems 30 of the above illustrated embodiments are particularly configured for IFOG's, such systems may also be used in a communications transceiver configuration.

Figure 5A:
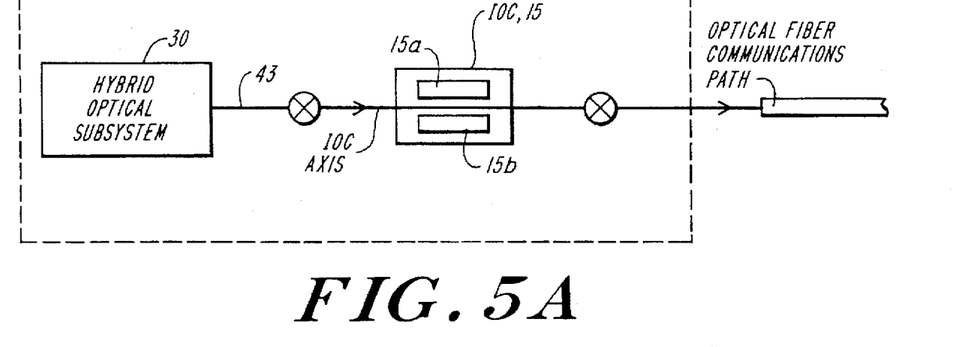
FIGS. 5A and 5B show exemplary transceiver configurations in accordance with the present invention.
Figure 5B:
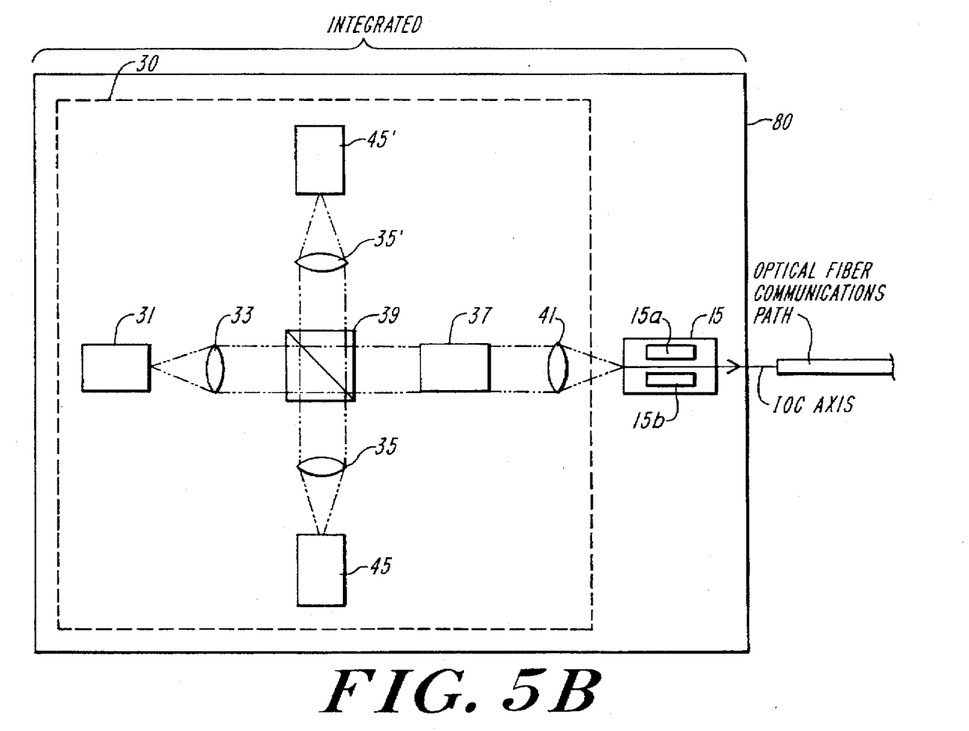

In such configurations, a polarizing integrated optics circuit (PIOC) is integrated with the system 30 to assemble efficient and relatively low cost transceiver. A principal feature of such a configuration is the savings of 6 dB of optical power (conveyed to the prior art configurations) and the reduction in fabrication complexity by the elimination of fiber coupler and number of fiber splices. Illustrative examples of such a transceiver module (TM) 80 are shown in FIGS. 5A and 5B. The cost/performance of the transceiver module 80 can be optimized by utilizing appropriate source for the given application. For low bandwidth communication systems a LED is sufficient (local network, control loop links). In the area of midrange bandwidth, a distributed feedback laser (DFB) is sufficient. The DFB source and any other more coherent sources typically require an optical isolator in the link. The system 30 PIOC combination provides this function without accruing any extra system cost. The long distance or high bandwidth communication links require coherent sources (solid state source) or crystal laser. The system 30 can easily incorporate this type of device, and provide the functions needed for this source to operate efficiently in a communications system. Further, the system 30 can incorporate a fiber amplifier for use in all optical fiber communication system. The transceiver module 80 may be integrated by incorporating the modulator inside the system 30, as shown in FIG. 5B, thereby reducing the need for the fiber splice and one fiber to integrated circuit interface.

Having described a specific embodiment of this invention, it will be apparent that other embodiments may be encompassed within the scope of the invention, and the invention is intended to be limited only by the scope of the appended claims.

What is claimed is:

1. An optical system for use in a fiber optic gyroscope having an optical fiber ring comprising;

a substrate;

a source of substantially monochromatic circularly polarized input light mounted on said substrate wherein said source is a light emitting diode (LED);

a polarizing beamsplitter;

first focusing means mounted on said substrate for collimating into a circular cross-section beam and focusing light from said monochromatic light source into said beamsplitter, wherein said focusing means includes au aspheric lens positioned between said source and said polarizing beamsplitter;

said beamsplitter including means for transmitting said input light linearly polarized in a first plane through it to form a linearly polarized output beam and reflecting said input light linearly polarized in a plane orthogonal to said first plane;

a non-reciprocal (NR) device mounted on said substrate and positioned to receive said linearly polarized output beam and pass it through said NR device in a first direction while rotating the plane of polarization of said light passing through it in said first direction by 45 degrees in one direction;

a pigtail fiber optic connector connected to said fiber optic ring;

a second focusing means mounted on said substrate for focusing light emitted from said nonreciprocal device into said fiber optic pigtail connector, and for focusing return light emitted from said fiber optic connector into said nonreciprocal device, whereby light is passed in a second direction through said non-reciprocal device and has its plane of polarization routed an additional 45 degrees in said one direction; said light emitted from said non-reciprocal device in said second direction being incident upon said beamsplitter with a plane of polarization rotated 90 degrees with respect to the plane of polarization of light emitted from said beamsplitter being arranged to reflect said return light rotated by said 90 degrees away from said light source, a photodetector element mounted on said substrate and positioned to receive light passing in said second direction into said polarizing beamsplitter which has been reflected away from said light source, wherein said pigtail connector includes: a single mode polarization maintaining (PM) optical fiber extending from an input/output (I/O) and along a fiber axis, and associated means for positioning said I/O end whereby said I/O end is aligned to receive light passing from said NR device in said one direction, and for passing light propagating in said second direction from said. PM fiber to said NR device.

2. An optical system according to claim 1 further comprising means for absorbing said input light reflected by said beamsplitter.

3. A system in accordance with claim 1 including a third focusing means mounted on said substrate for focusing said light passing in said second direction onto said photodetector.

4. An optical system according to claim 3 further comprising means for absorbing said input light reflected by said beamsplitter.

5. An optical system for use in a fiber optic gyroscope having an optical fiber ring comprising;

a substrate;

a source of substantially monochromatic circularly polarized input light mounted on said substrate, wherein said source is a light emitting diode (LED);

a polarizing beamsplitter mounted on said substrate;

a first lens mounted on said substrate and positioned to receive light from said source of monochromatic light, said first lens being aspheric;

said aspherical lens collimating into a circular cross-section beam and focusing light from said monochromatic light source into said beamsplitter, said beamsplitter transmitting said input light linearly polarized in a first plane through it to form a linearly polarized output beam and reflecting said input light linearly polarized in a plane orthogonal to said first plane;

a non-reciprocal (NR) device mounted on said substrate and positioned to receive said linearly polarized output beam and pass it through said NR device in a first direction while rotating the plane of polarization of said light passing through it in said first direction by 45 degrees in one direction a pigtail fiber optic connector connected to said fiber optic ring;

a second lens mounted on said substrate and positioned to focus light emitted from said nonreciprocal device into said fiber optic pigtail connector, and to focusing return light emitted from said fiber optic connector into said nonreciprocal device, whereby light is passed in a second direction through said non-reciprocal device and has its plane of polarization rotated an addition 45 degrees; said light emitted from said non-reciprocal device in said second direction being incident upon said beamsplitter with a plane of polarization rotated 90 degrees with respect to the plane of polarization of light emitted from said beamsplitter being arranged to reflect return light rotated by said 90 degrees away from said light source;

a photodetector element mounted on said substrate and positioned to receive light passing in said second direction into said polarizing beamsplitter which has been reflected away from said light source, wherein said pigtail connector includes: a single mode polarization maintaining (PM) optical fiber extending from an input/output I/0 and along a fiber axis, and associated means for positioning said I/O end whereby said I/O end is aligned to receive light passing from said NR device in said one direction, and for passing light propagating in said second direction from said PM fiber to said NR device.

6. A system in accordance with claim 4 including a third aspherical lens mounted on said substrate for focusing said light passing into said beamsplitter in said second direction onto said photodetector, said third lens being aspheric.

7. An optical system comprising:
A. a rigid substrate
B. a polarizing beamsplitter having a first input axis, a second input axis, a first output axis and a second output axis, said first and second output axes being substantially parallel, said first output axis and said second input axis being coincident, and said beamsplitter being adapted to:
   i. pass light incident along said first input axis and polarized in a first input polarization plane along a first output axis,
   ii. reflect light incident along said first input axis and polarized in a second polarization plane being orthogonal to said second polarization plane, said first output axis being angularly offset with respect to said second output axis,
   iii. reflect light incident along said second input axis and polarized in said second polarization plane along a third output axis, said third output axis, being angularly offset with respect to said first and second output axes,
C. a non-reciprocal (NR) device defining a non-reciprocal propagation path extending therethrough along an NR axis, whereby the polarization plane of light incident on said NR device and passing along said NR axis through said NR device in one direction is rotated by an angle substantially equal to 45 degrees in a first direction from said polarization plane, and the polarization plane of light incident on said NR device and passing along said NR axis through said NR device in the direction opposite to said one direction is rotated by an angle substantially equal to 45 degrees in said first direction from said polarization plane,
D. means for affixing said polarizing beamsplitter and said NR device to said substrate in a serial configuration whereby first output axis of said polarizing beamsplitter is substantially coaxial with said second input axis of said polarizing beamsplitter and said NR axis of said NR device, and whereby light passing along said second output axis from said polarizing beamsplitter is directed to said propagation path of said NR device along said NR axis, and light passing along said propagation path of said NR device along said NR, axis toward polarizing beamsplitter is directed along said second input axis.
E. a single mode polarization maintaining (PM) optical fiber extending from an input/output (I/0) end along a fiber axis, and associated means for positioning said I/O end whereby said I/0 end is opposite NR device and adapted to receive light passing from said NR device in said one direction and for passing light to said NR device in said direction opposite to said one direction, and whereby said fiber axis is substantially aligned with said NR axis,
F. an aspheric lens positioned along said input axis before said polarizing beamsplitter including means for collimating light applied thereto into a circular section cross beam directed to be incident on and focused into said polarizing beamsplitter, and
G. an optical source including generating means for generating light and directing said generating light to be incident on said polarizing beamsplitter along said first input axis; wherein said generating means is a light emitting diode (LED) directed to be incident on and focused into said polarizing beamsplitter.

8. An optical system according to claim 7 further comprising means for maintaining the relative positions of said substrate, said beamsplitter and said NR device to be substantially fixed.

9. An optical system according to claim 7 further comprising means for maintaining said substrate at a desired temperature.

10. An optical system according to claim 7 further comprising:
a first photodetector including means for receiving light reflected by said polarizing beamsplitter along said third output axis and including means for generating a signal representative of the intensity of said received light.

11. An optical system according to claim 10 further comprising:
a second photodetector including means for receiving light reflected by said polarizing beamsplitter along said second output axis and including means for generating a signal representative of the intensity of said received light.

12. An optical system according to claim 7 further comprising:
means for coupling light passing from said NR device along said NR axis in said one direction to an optical fiber sensor of a gyroscope and for coupling light from said optical fiber of a gyroscope to said NR device along said NR axis in said direction opposite to said one direction.

13. An optical system according to claim 12 wherein said sensor is a loop.

14. An optical system according to claim 12 wherein said sensor is a ring.

15. An optical system according to claim 7 wherein said NR device is a Yytrium-Iron-Garnet (YIG) device.

16. An optical system according to claim 7 further comprising an optical circuit having an IOC part with an IOC axis optically coupled to said NR device whereby light passing along said NR axis is coupled to pass along said IOC axis and to an elongated optical fiber communications path.

17. An optical system according to claim 7 further comprising a fiber optic loop having a first end and a second end, and an optical circuit having an IOC part with an IOC axis optically coupled to said NR device whereby light passing along said NR axis is coupled to pass along said NR axis and having a splitter to establish a first optical path optically coupling said IOC port to said first end of a fiber optic loop and to establish a second optical path for optically coupling said IOC port to said second end.

* * * * *